July 28, 1925.  
H. D. SAWKINS  
MOLDING AND BAKING APPARATUS  
Filed Aug. 4, 1924
1,547,614
3 Sheets-Sheet 1
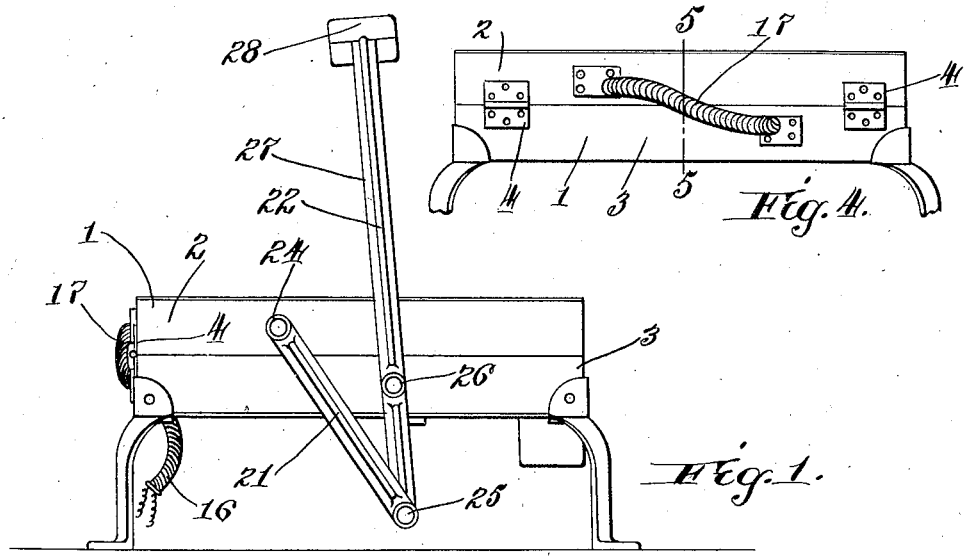
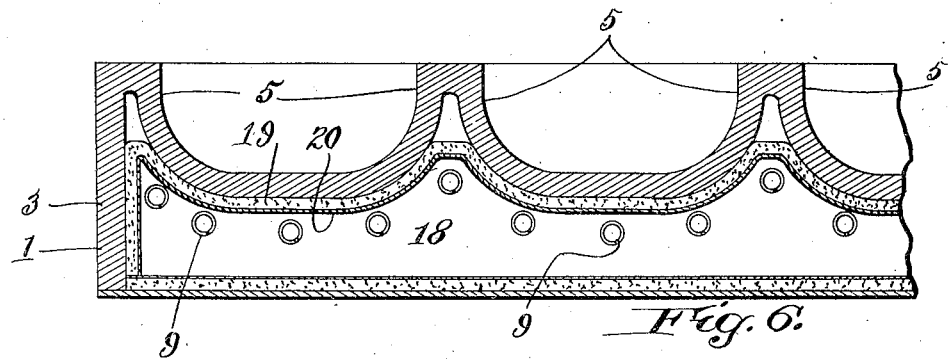
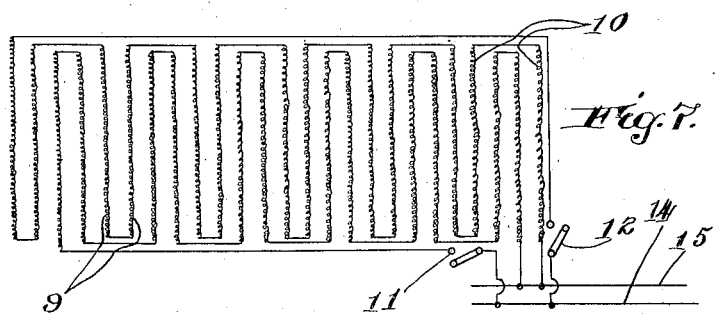

July 28, 1925.
H. D. SAWKINS
MOLDING AND BAKING APPARATUS
Filed Aug. 4, 1924
1,547,614
3 Sheets-Sheet 2
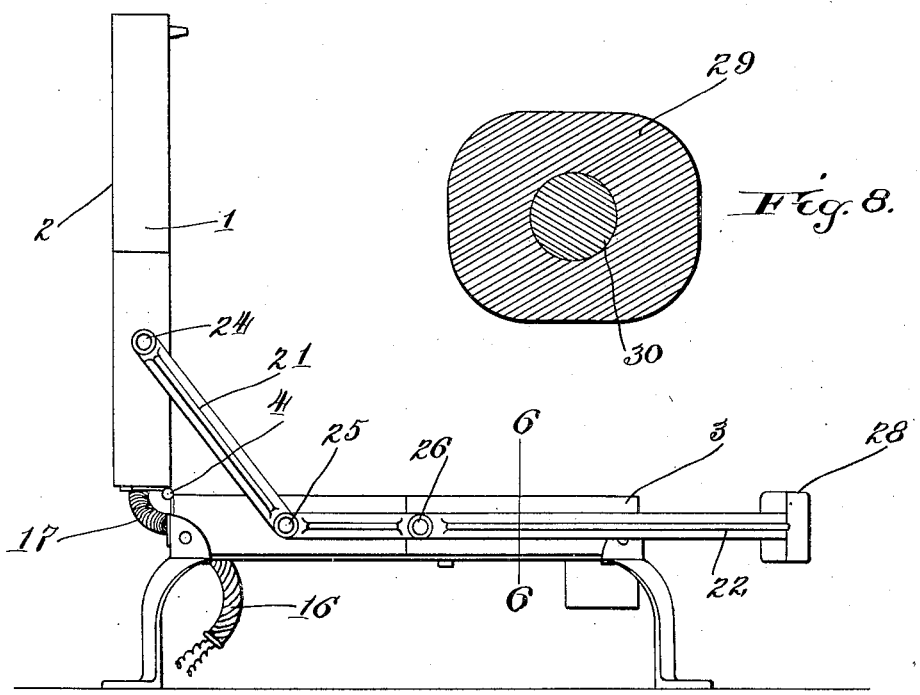
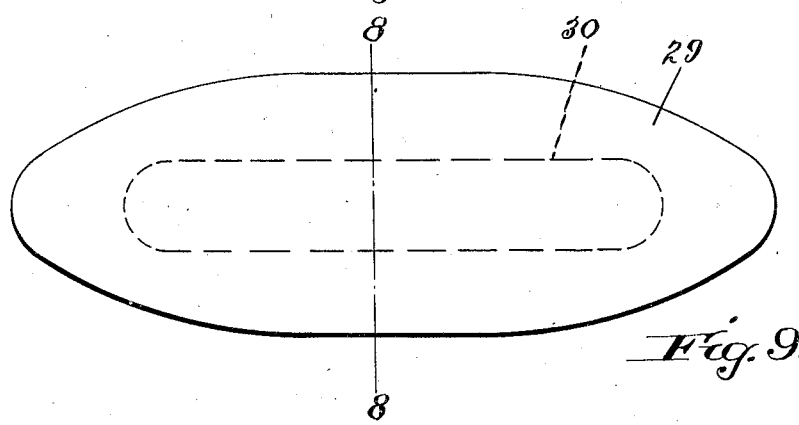

July 28, 1925.  
H. D. SAWKINS  
MOLDING AND BAKING APPARATUS  
Filed Aug. 4, 1924  
1,547,614  
3 Sheets-Sheet 3
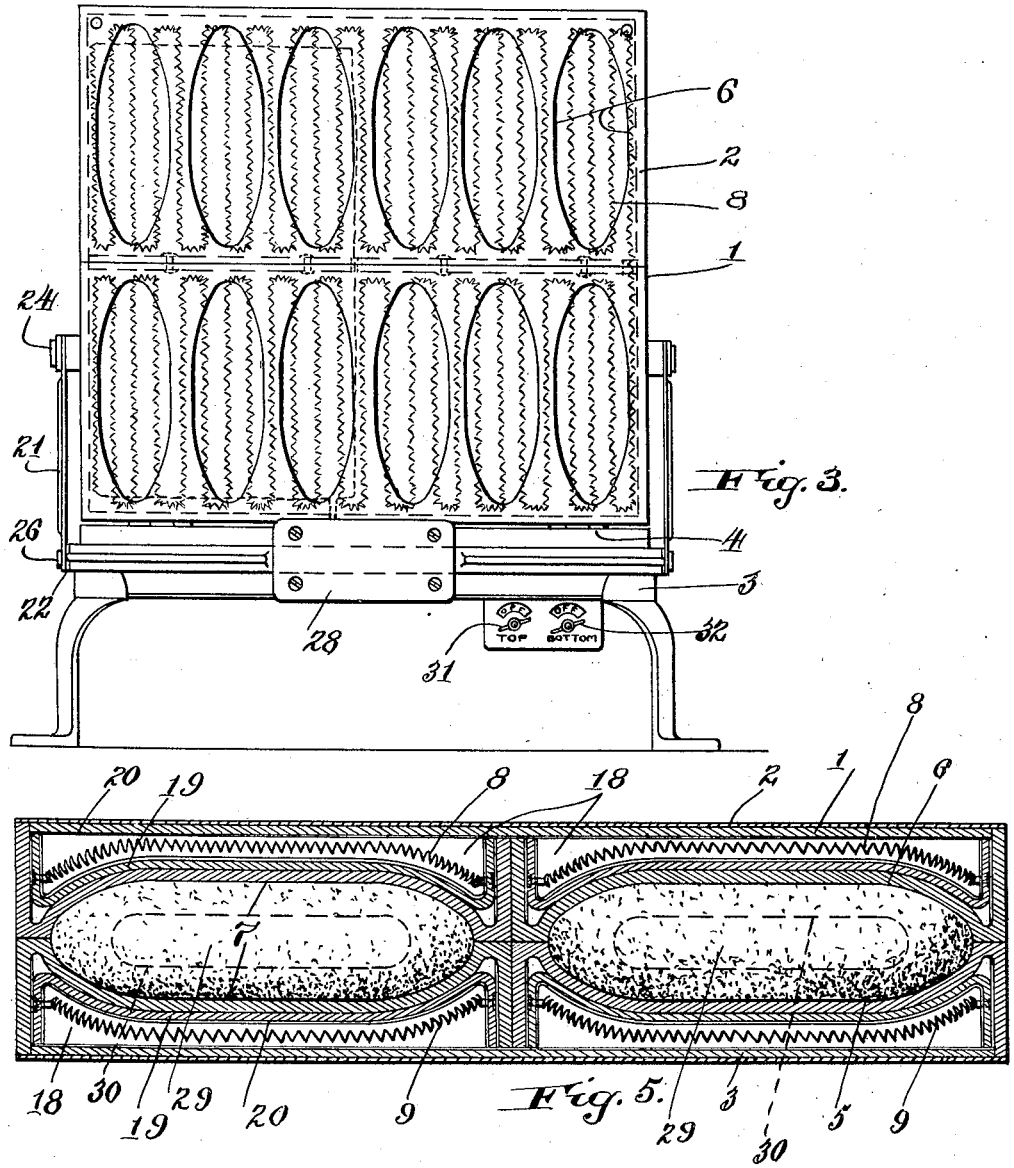

Patented July 28, 1925.

1,547,614

UNITED STATES PATENT OFFICE.

HUNTINGTON D. SAWKINS, OF BALTIMORE, MARYLAND.

MOLDING AND BAKING APPARATUS.

Application filed August 4, 1924. Serial No. 729,915.

*To all whom it may concern:*

Be it known that I, HUNTINGTON D. SAWKINS, a citizen of the United States of America, residing in the city of Baltimore, State of Maryland, have invented certain new and useful Improvements in a Molding and Baking Apparatus, of which the following is a specification.

The present invention relates to an apparatus for cooking rolls and sausages, as per my co-pending application No. 705,410.

It comprises a sectional mold for the rolls composed of upper and lower hinged parts, with means for heating the mold sections, the said means being shown in the present application in the form of electric heating units, one form of the disclosure including a double circuit whereby the heating effect may be varied with a current of given voltage and amperage.

An important feature of the invention is that it provides for cooking rolls with a sausage enclosed within each roll and baked in and with the roll, thereby producing an article of diet which is new and greatly improved as compared to the usual form of sausage sandwich. A common objection to the old and well known commodity is, as stated in the previous application, that the rolls are necessarily obtained in quantity and are often quite dry and stale and unappetizing, and the price for which such sandwiches are sold is ordinarily too low to permit of the rolls being buttered. These difficulties are overcome by the present invention which provides for cooking the roll and sausage together simultaneously, the sausage being enclosed within the roll, and imparting to the roll a flavor and moisture which makes the entire article extremely appetizing and dispenses with the necessity for butter, affording a cheap and satisfactory article of diet which can be prepared and sold over the counter at the different resorts, meeting exactly the same demand as is now met by the ordinary sausage sandwich and providing an article which is much more attractive.

The apparatus of the invention consists of a two-part mold or baker having co-operating cavities in the respective parts, which, when the parts are closed or united, form closed cavities or chambers. In operation the cavities in the lower half of the mold are each partially filled, the charge in each instance consisting of a sausage wrapped or enclosed in dough.

When the desired number of sausage rolls are thus provided for, the mold is closed and heated either electrically or in any other suitable manner, the heat being maintained for a sufficient period to bake the dough and sausage to the desired degree. The mold is then opened, releasing the cooked sausage rolls which may be removed at once ready for consumption.

In the preferred form of the invention a double circuit is provided so that after baking is completed the heat may be reduced, keeping the product warm and in attractive condition until sold.

In the accompanying drawing I have illustrated a baking apparatus embodying the various features of my invention in the preferred form.

In the drawing,—

Figure 1 is a side elevation of the baking apparatus closed and ready for operation.

Figure 2 is a side elevation of the apparatus open ready to receive the dough and sausages.

Figure 3 is a front elevation of the apparatus opened as in Figure 2.

Figure 4 is a rear elevation of the apparatus closed.

Figure 5 is a longitudinal section on the line 5, 5 of Figure 4.

Figure 6 is a transverse section on the line 6, 6 of Figure 2.

Figure 7 is a circuit plan showing a modified form of circuit.

Figure 8 is a transverse section showing the product in the preferred form on the line 8, 8 of Figure 9; and Figure 9 is a plan of the same.

Referring to the drawings by numerals, the apparatus consists of a baking mold 1, composed of upper and lower sections 2 and 3 connected by hinges 4, each of said sections being formed with a series of cavities or depressions 5 in the lower section, and 6 in the upper section, which cavities or depressions are adapted to register one with the other when the molds are closed, forming baking chambers 7, see Figure 5, each in the shape of a sausage roll. The baking apparatus is also provided with heating means, which in the form of the invention shown consists of one or more electrical heating units.

In the illustration I have shown electrical heating coils 8 for the upper section and 9 for the lower section, with suitable connections for each set of coils. Any desired circuit plan may be used to energize the heating coils.

In Figure 7 I have shown the coils or units in either section in two separate series 10 and 10', controlled by switches 11 and 12, respectively. The circuits are connected between busses or mains 14 and 15, which may be energized from any suitable source. The heating effect may be controlled by means of these switches, giving half the full capacity, or full capacity, or entirely cutting off the heat, and in addition to such variation the heating effect may be varied in other well known ways, as by introducing resistance or varying the difference in potential between the mains 14 and 15.

The current is led to the lower section 3 by means of a flexible cable 16 and to the upper or swinging section 2 by flexible cable 17 connecting the two sections near the hinges, the cable which in enclosed in a flexible pipe being turned in a direction approaching the parallel to the hinge axes or pins, as seen most clearly in Figure 4, so as to give flexibility without undue tendency to puncture the connection.

The coils 8 are, as shown, see particularly Figures 5 and 6, placed in suitable chambers 18 in the walls of the mold sections, which chambers are lined with insulating material 19, as asbestos or the like, covered as to the interior surface with sheet mica 20 or other suitable thin sheet insulating material.

Referring particularly to Figures 1 and 2, it will be noted that the mold is opened and closed by a combination of levers consisting of a short lever or connecting rod 21 and a centrally pivoted lever or toggle arm 22. The connecting rod 21 is pivotally connected to the upper section by means of a wrist pin 24 and to the swinging end of the lever 22 by a second pin, which will be referred to herein as a crank pin 25. The lever 22 is pivoted intermediately of its length at 26 to the lower section 3 and extends beyond the pivot 26 in the opposite direction from the pin 25 for a distance which in the form shown amounts to about two and one-half times the arm 25, 26, and this arm 27 is provided at its outer swinging end with a handle 28.

In the closed position of the mold, as shown in Figure 1, the lever 22 is upright or substantially vertical, the mold sections being pressed together by moving the handle 28 backward, i. e., in lefthand rotation in Figure 8 about the pin 26. While the fastening is not a complete toggle action in that the levers do not swing to or past centre so as to give a positive locking of the apparatus, the closure operates upon the principle of a toggle, giving a closing effect which is less efficient in proportion as the pins 24 and 26 are out of alignment with the direction of resistance to the closing force.

In Figures 8 and 9 I have shown an article of diet made in accordance with my invention, the same consisting of a roll or similar small individually baked loaf of bread 29, within which is enclosed a sausage 30, the same being not only enclosed in but baked in and with the roll. The operation will be understood in connection with the preamble and description of the apparatus. The baker or baking mold is preferably given a preliminary heating by turning on one or more of the heating coils or otherwise applying heat externally, it being understood that the electrical heating apparatus is optional, the device being heated in any preferred manner. The baking mold or baker being thus suitably heated, the cavities are then greased or floured to prevent sticking, and all the preliminaries having been provided for, a suitably quantity of dough is placed in each cavity or depression 5 of the lower mold section, each said quantity or charge of dough containing, enclosing or being wrapped about a sausage of any preferred variety, which is placed in the mold enclosed within and surrounded by the dough. The mold is then closed by raising the handle 28 and heated, the heat being continued, increased or applied depending upon the previous condition of the apparatus and the amount of heat deemed necessary to bake the dough and sausage placed within the mold.

The rolls and the sausage enclosed therein having been suitably baked or cooked, the heat is shut off or otherwise discontinued or reduced, and the product is removed from the baker if it is to be served immediately or allowed to remain therein in order to keep it warm and palatable if it is to be served later or from time to time. Usually the demand of such a commodity is more or less variable, so that the facility with which the sausage rolls may be kept warm for an extended period is of considerable importance. One of the chief advantages of the apparatus is the increased palatability of the sausage roll or sausage and roll prepared in this way as compared with the ordinary type of sausage sandwich in which the sausages are cooked to order and placed between layers of split comparatively stale roll is of the greatest importance, it being the applicant's experience that sausage rolls prepared in this way are not only much more attractive and palatable than those made in the old-fashion way from split rolls, and this improvement is so apparent even to the casual observer, that the new product can be sold in competition with the previously known article in much less time for a given quantity and to the practical exclusion of the previously known article when the improved product is sufficient to meet the demand.

I have thus described specifically and in detail a single embodiment of my invention in order that the nature and operation of the same may be clearly understood; however, the specific terms herein are used descriptively rather than in a limiting sense, the scope of the invention being defined in the claim.

What I claim and desire to secure by Letters Patent is:

A molding and baking apparatus for sausage rolls and the like, consisting of a mold composed of two sections hinged together, the sections having cavities which register when the mold is closed to form a mold chamber, means for heating said sections and means for opening and closing the sections consisting of a rod pivotally connected at one end to the upper section, an arm pivotally connected intermediate its length to the lower section, a pivotal connection between the other end of the rod and an end of the arm giving the effect of a toggle fastening, and means at the free end of the arm adapted for engagement to open and close the mold section.

Signed by me at Baltimore, Maryland, this 23rd day of July, 1924.

HUNTINGTON D. SAWKINS.

Witnesses:
PORTER H. FLAUTT,
E. WEHMEYER.